United States Patent [19]

van de Brand

[11] Patent Number: 4,987,730
[45] Date of Patent: Jan. 29, 1991

[54] DEVICE FOR PICKING PULSE CROPS

[75] Inventor: Anton M. van de Brand, At Wernhout, Netherlands

[73] Assignee: Mali-Ploeger B.V., Oudenbosch, Netherlands

[21] Appl. No.: 391,776

[22] Filed: Aug. 9, 1989

[30] Foreign Application Priority Data

Aug. 18, 1988 [NL] Netherlands .......................... 8802048

[51] Int. Cl.⁵ ............................................ A01D 45/22
[52] U.S. Cl. ...................................... 56/16.4; 56/156; 56/327.1; 460/143
[58] Field of Search ......................... 56/156, 16.4, 16.5, 56/16.6, 327.1; 460/123, 126, 143, 127, 128, 129

[56] References Cited

U.S. PATENT DOCUMENTS

| Re. 27,528 | 11/1972 | Looker et al. | 56/327.1 |
| 1,601,120 | 9/1926 | Helm . | |
| 2,608,973 | 9/1952 | Coons | 460/127 |

FOREIGN PATENT DOCUMENTS 1332749 7/1963 France .
2146036 2/1973 France .
7903397 11/1980 Netherlands .

OTHER PUBLICATIONS

Agricultural engineering, vol. 50, No. 7, Jul. 1969, "A Mechanical Harvester for Southern Peas", pp. 412-413.

Primary Examiner—Ramon S. Britts
Assistant Examiner—Terry Lee Melius
Attorney, Agent, or Firm—Ladas & Parry

[57] ABSTRACT

The invention relates to a device for picking pulse crops, said device being provided with a frame, with a picking drum having teeth, which is supported by the frame and which is rotatable about a substantially horizontal axis of rotation, and with a guide plate extending around the drum and co-operating therewith, as well as with transport and cleaning means for the picked pulse crop. Furthermore the frame is provided with coupling means for coupling the frame to the three-point hitch of a tractor or the like. The construction is such that during operation the drum will be located beside the tractor, seen in the intended direction of movement, whilst the transport and cleaning means will be located at least largely behind the tractor.

12 Claims, 2 Drawing Sheets

DEVICE FOR PICKING PULSE CROPS

BACKGROUND OF THE INVENTION

Field of the Invention

The invention relates to a device for picking pulse crop, said device being provided with a frame, with a picking drum having teeth, which is supported by the frame and which is rotatable about a substantially horizontal axis of rotation, and with a guide plate extending around the drum and co-operating therewith, as well as with transport and cleaning means for the picked pulse crop.

SUMMARY OF THE INVENTION

The object of the invention is to obtain a device of the above kind, which has a light and compact construction and is suitable for being moved and driven by means of a tractor or the like.

According to the invention this can be achieved in that the frame is provided with coupling means for coupling the frame to the three-point hitch of a tractor or the like, whereby the construction is such that during operation the drum will be located beside the tractor, seen in the intended direction of movement, whilst the transport and cleaning means will be located at least largely behind the tractor.

According to a further aspect of the invention the device of the kind mentioned in the preamble is provided with a first conveyor belt, which transports the crop obliquely upwards from the picking drum in the direction of a duct in which an upward air flow is generated by means of a fan arranged near the upper end of the duct, whilst a second upwardly extending conveyor is arranged in the duct, spaced from the discharge end of the first conveyor, such that during operation there is an upward air flow on both sides of said second conveyor.

A double cleaning of the crop can hereby be suitably achieved in a limited space by means of a single fan or the like exhaust system, by means of the two upward air flows.

BRIEF DESCRIPTION OF THE DRAWINGS

The invention will be further explained hereafter, with reference to an embodiment of a device according to the invention diagrammatically illustrated in the accompanying figures.

DESCRIPTION OF THE PREFERRED EMBODIMENT

Figure 1:
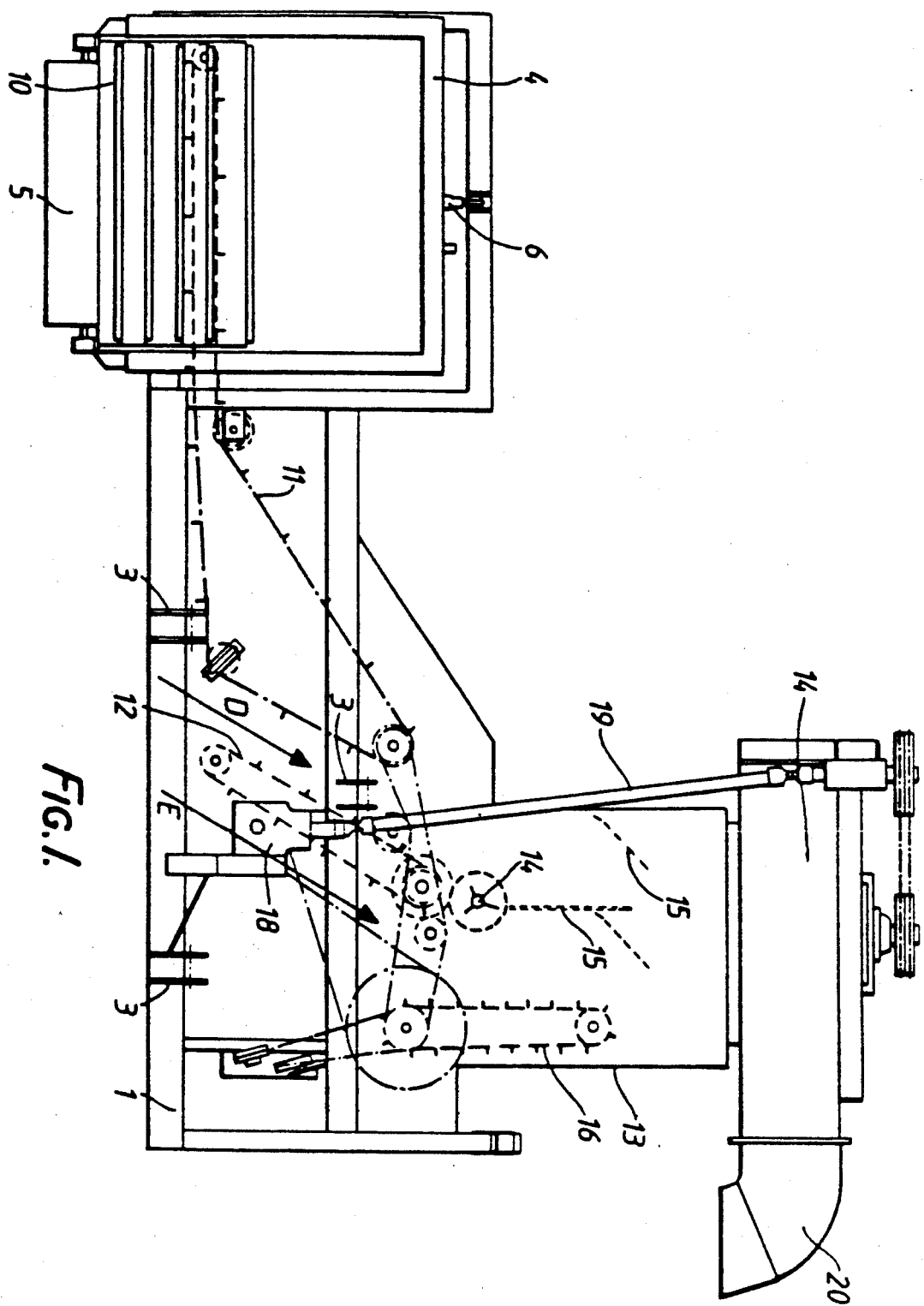
FIG. 1 is a diagrammatic front view of the device according to the invention.

The device comprises a frame 1, which is provided, in a manner known per se, with projecting ears 3 by means of which the device can be coupled, in a manner per se, to the three-point hitch of a tractor or the like.

To one end of the frame, which will project beyond the side of tractor when the frame 1 is coupled to a tractor or the like, an auxiliary frame 4 is coupled to the frame, so as to be resiliently vertically movable, by means of means not shown. The vertically movable auxiliary frame 4 is thereby supported by a roller 5, which is journalled in the frame and resting on the ground, said roller being freely rotatable about a horizontal axis of rotation. Between the upper side of the frame 4 and the frame 1 there is coupled a connecting rod 6 which is longitudinally adjustable, by means of which the auxiliary frame 4 can be slightly tilted forwards or backwards relative to the frame 1.

In the auxiliary frame 4 there is journalled a picking drum 8 having teeth 7 and being rotatable about a horizontal axis of rotation, said picking drum being surrounded by a cover 9 along part of its circumference. The frame 4 furthermore supports a conveyor belt 10 which is arranged in front of the picking drum 8, said conveyor belt extending obliquely downwards and rearwards from its foremost point.

The construction of such a picking drum and conveyor belt for picking pulse crops is known per se, e.g. from the European patent application No. 0,246,697.

Behind the picking drum there is located a horizontally extending part of an endless conveyor belt 11 supported by the frame 1. The upper part of said conveyor belt 11, extending horizontally behind the picking drum, merges into a part that slopes upwards beside the picking drum, as appears in particular from FIG. 1, said part extending to a point located approximately centrally behind the tractor, in order to merge from there into a part that slopes downward and in the direction of the picking drum again. Spaced by a short distance from said downwardly sloping part of the conveyor belt 11 there is provided a further endless belt 12, sloping upwards substantially parallel to said part. The conveyor belt 12 and the end of the conveyor belt 11 located near said conveyor belt 12 are arranged in a duct or chute 13 supported by the frame, on whose upper side there is provided an exhaust system 14 in the shape of a fan or the like. Above the upper end of the conveyor belt 12 there is furthermore provided a blade wheel 14 in the duct 13, whilst further in the duct there are arranged baffles 15, which extend partly transversely to the longitudinal direction of the duct 13.

Spaced by some distance from the upper end of the upwardly sloping endless conveyor belt 12 there is provided another endless conveyor belt 16, provided with pins, which extends at least substantially in the longitudinal direction of the duct 13, from a point which is spaced by a short distance from the uppermost point of the conveyor belt 12, to a point located at some distance under the exhaust system 14.

Figure 2:
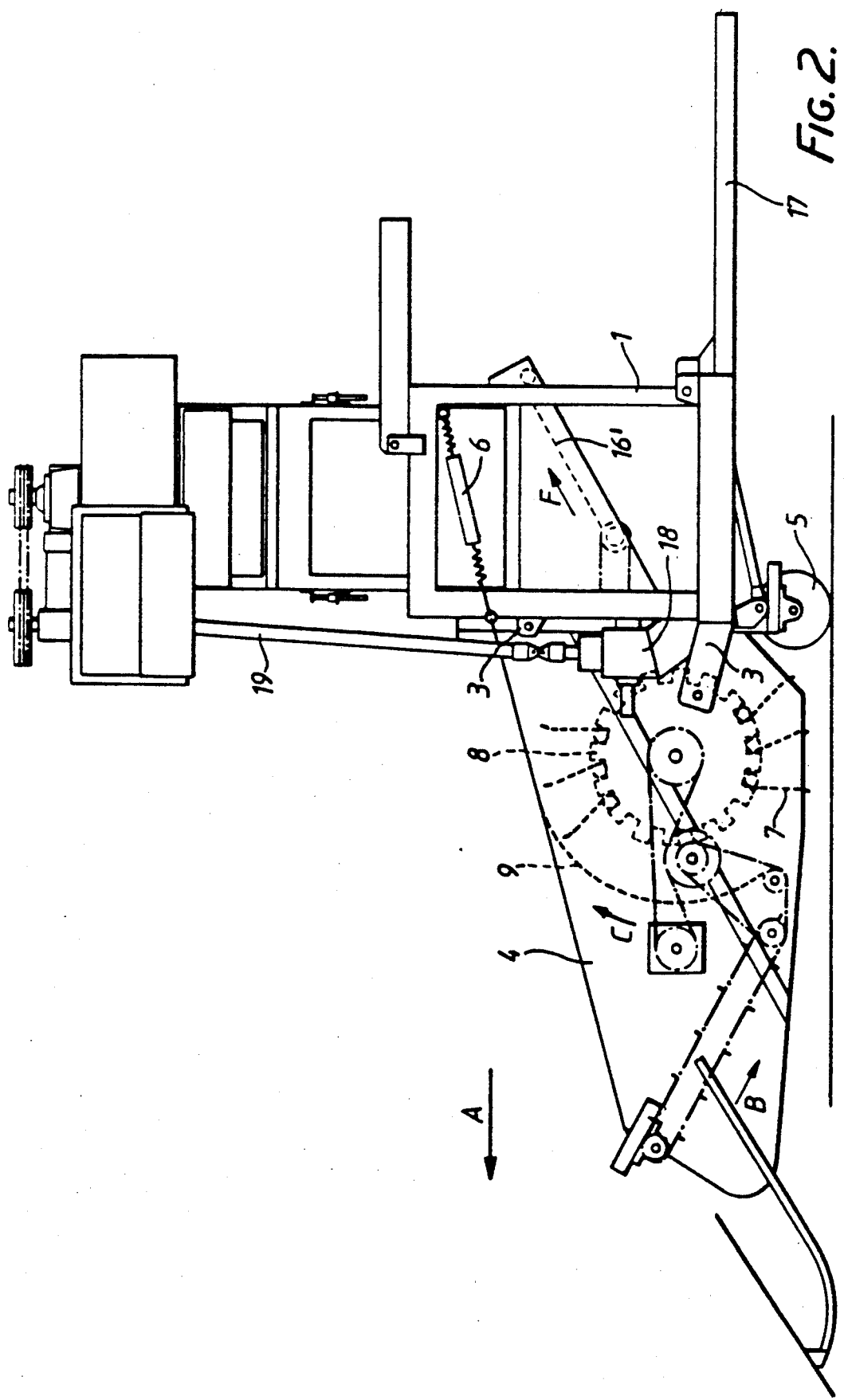
FIG. 2 is a diagrammatic side view of the device illustrated in FIG. 1.

As is furthermore illustrated in FIG. 2 an endless conveyor belt $16^1$ is provided near the lower side of the tubular duct 13, said conveyor belt being guided about guide rollers whose axes of rotation extend horizontally and transversely to the intended direction of movement of the device. As appears from FIG. 2 said conveyor belt 16 thereby slopes upwards to the rear. The upper end of the conveyor belt $16^1$ is thereby located near a platform 17 provided at the rear side of the frame 1.

The various parts of the device described above, which are to be driven, can be driven from the power take-off shaft of the tractor supporting the device during operation, which power take-off shaft can be coupled, by means of an auxiliary shaft, to a gearbox 18 mounted on the frame 1. The gearbox 18 is connected, by means of an auxiliary shaft 19, t the exhaust system 14. The gearbox 18 is furthermore coupled, by means of belt or chain transmissions shown only partly and diagrammatically, to various other parts of the device, such as the picking drum and the above-mentioned conveyor belts.

During operation the device will be moved in the direction according to the arrow A by means of the tractor or the like supporting the device. The conveyor belt 10 is driven in such a manner that the lower part of the conveyor belt moves in the direction according to arrow B, whilst the drum rotates in the direction according to arrow C during operation.

The bean shrubs on the field are bent over by the conveyor belt 10 and brought within the reach of the teeth 7 of the picking drum 8. Beans picked off by means of the teeth are moved upwards and rearwards along the inner side of the cover 9 and deposited on the upper part of the conveyor belt 11. The upper part of the conveyor belt 11 extending transversely to the intended direction of movement according to arrow A will sling the picked beans and leaves possibly taken along in the direction of the conveyor belt 12, through the air flow generated by the exhaust system in the direction according to arrow D. Because of said air flow the light components will be exhausted by means of the exhaust system 14, in order to be discharged via the outlet 20 of said system.

The produces falling on the conveyor belt 12 and slung in the direction of the pin belt 16 near the upper end of said conveyor belt. Crop parts which adhere to each other are separated by the blade wheel 14'. Also here the crop is exposed to an air flow in the direction according to arrow E, which is likewise generated by the exhaust system 14 at the side of the conveyor belt 12 remote from the conveyor belt 11. Also this air flow effects a further separation between the lighter components and the heavier pulse crops, e.g. beans. The transport upwards of the lighter components is supported by the pin conveyor 16, which also moves loose leaves or branches upwards.

The heavy pulse crops will fall downwards and thereby land on the upper part of the conveyor belt $16^1$, which moves in the direction according to arrow F during operation. By means of said conveyor belt the picked pulse crops are supplied to e.g. sacks or cases placed on the platform 17, or to a further transport means mounted on said platform, by means of which pulse crops can e.g. be supplied to a wagon or the like driving along the tractor or being drawn by the tractor.

Although in the illustrated embodiment there is applied a picking drum whose axis of rotation extends transversely to the intended direction of movement of the device during operation, it will also be possible to use the construction according to the invention when a picking drum is used whose axis of rotation extends more in the intended direction of movement of the device.

The height of the front edge of the cover 9 can be set by pivoting of the auxiliary frame by means of the extension rod 6.

I claim:

1. Device for picking pulse crops comprising:
a frame provided with a coupling means for coupling the frame to the three-point hitch of a tractor;
a picking drum having teeth, said picking drum being supported by said frame and rotatably mounted about a substantially horizontal axis of rotation;
a cover partially surrounding said picking drum and fixably connected to said frame;
transport and cleaning means connected to the frame for the picked pulse crop comprising a first conveyor belt with a discharge end, said first conveyor belt transporting the crop obliquely upwards from the picking drum, a duct having a fan arranged near the upper end of the duct generating an upward air flow in the duct, said duct and fan located near the discharge end of said first conveyor belt, and a second upwardly extending conveyor belt with an upper and lower end arranged in the duct, spaced apart from the discharge end of the first conveyor belt, such that during operation, there is an upward air flow on both sides of said second conveyor belt; and
an upwardly extending endless belt with an upper and lower end, said upwardly extending endless belt provided with pins and positioned in said duct at the side of the second conveyor belt remote from said first conveyor belt, said endless belt with pins extending upwards in said duct and having a lower end at approximately the same height as the upper end of said second conveyor belt, wherein during operation of the device, said picking drum is located beside the tractor and the transport and cleaning means are located at least largely behind the tractor.

2. Device according to claim 1, characterized in that, seen in the intended direction of movement, the second conveyor belt is located near the coupling means for coupling the frame to the three-point hitch of a tractor.

3. Device according to claim 2, characterized in that at least under the discharge end of the second conveyor there is arranged a third endless conveyor, by means of which pulse crops falling from the second conveyor can be transported obliquely upwards and rearwards.

4. Device according to claim 2, characterized in that near the upper end of the second conveyor belt there is provided a blade wheel.

5. Device according to claim 2, characterized in that the picking drum is journalled in an auxiliary frame, which is vertically movable relative to the frame and which is supported by a roller mounted on the frame.

6. Device according to claim 1, characterized in that at least under the discharge end of the second conveyor there is arranged a third endless conveyor belt, by means of which pulse crops falling from the second conveyor can be transported obliquely upwards and rearwards.

7. Device according to claim 6, characterized in that at the rear side of the frame there is provided a platform for supporting means which receive the pulse crops supplied by the further conveyor.

8. Device according to claim 1, characterized in that near the upper end of the second conveyor belt there is provided a blade wheel.

9. A device according to claim 1, characterized in that at least under the discharge end of the second conveyor there is arranged a third endless conveyor, by means of which pulse crops falling from the second conveyor can be transported obliquely upwards and rearwards.

10. Device according to claim 1, characterized in that near the upper end of the second conveyor belt there is provided a blade wheel.

11. Device according to claim 1, characterized in that the picking drum is journalled in an auxiliary frame, which is vertically movable relative to the frame and which is supported by a roller mounted on the frame.

12. Device for picking pulse crops comprising:
a frame provided with a coupling means for coupling the frame to the three-point hitch of a tractor;

a picking drum having teeth having an approximately horizontal axis of rotation;

a cover partially surrounding said picking drum and fixably connected to said frame;

transport and cleaning means for the picked pulse crop;

an auxiliary frame having an upper and lower side, said auxiliary frame being vertically moveable relative to said frame, and supported by a roller mounted on the frame, said picking drum being journalled to said auxiliary frame; and adjustment means connecting the upper side of the auxiliary frame to the frame, by means of which the auxiliary frame can be adjusted relative to the frame about a pivot point extending parallel to the axis of rotation of said picking drum, whereby during operation of the device, said picking drum is located beside the tractor and the transport and cleaning means are located at least largely behind the tractor.

* * * * *

UNITED STATES PATENT AND TRADEMARK OFFICE
CERTIFICATE OF CORRECTION

PATENT NO. : 4,987,730
DATED : January 29, 1991
INVENTOR(S) : Antonius Maria van de Brand It is certified that error appears in the above-identified patent and that said Letters Patent is hereby corrected as shown below:

On the title page, item [75] Inventor:

please correct spelling of the inventor's name to

-- Antonius M. van de Brand--.

Signed and Sealed this

Seventh Day of April, 1992

*Attest:*

HARRY F. MANBECK, JR.

*Attesting Officer*  *Commissioner of Patents and Trademarks*